(12) United States Patent
Žaliauskas et al.

(10) Patent No.: US 11,757,841 B2
(45) Date of Patent: Sep. 12, 2023

(54) CONFIGURING A PROTOCOL IN A VIRTUAL PRIVATE NETWORK

(71) Applicant: Netflow, UAB, Vilnius (LT)

(72) Inventors: Nikodemas Žaliauskas, Vilnius (LT); Karolis Kaciulis, Lithuania (LT)

(73) Assignee: Netflow, UAB, Vilnius (LT)

( * ) Notice: Subject to any disclaimer, the term of this patent is extended or adjusted under 35 U.S.C. 154(b) by 0 days.

(21) Appl. No.: 17/472,677

(22) Filed: Sep. 12, 2021

(65) Prior Publication Data
US 2023/0081806 A1  Mar. 16, 2023

Related U.S. Application Data

(63) Continuation of application No. 17/472,672, filed on Sep. 12, 2021.

(51) Int. Cl.
*H04L 9/40* (2022.01)
*H04L 69/24* (2022.01)
*H04L 69/00* (2022.01)
*H04L 41/0803* (2022.01)
*H04L 67/141* (2022.01)
*H04L 41/08* (2022.01)
*H04L 12/46* (2006.01)
*H04L 67/01* (2022.01)
*H04L 67/12* (2022.01)

(52) U.S. Cl.
CPC ...... *H04L 63/0272* (2013.01); *H04L 12/4641* (2013.01); *H04L 41/08* (2013.01); *H04L 41/0803* (2013.01); *H04L 63/029* (2013.01); *H04L 63/0435* (2013.01); *H04L 67/01* (2022.05); *H04L 67/141* (2013.01); *H04L 69/24* (2013.01); *H04L 69/26* (2013.01); *H04L 67/12* (2013.01)

(58) Field of Classification Search
CPC . H04L 12/4641; H04L 41/08; H04L 41/0803; H04L 63/0272; H04L 67/141; H04L 67/42; H04L 69/24; H04L 69/26; H04L 67/12; H04L 63/029; H04L 63/0435; H04L 67/01; H04L 12/4633; H04L 41/0806
See application file for complete search history.

(56) References Cited

U.S. PATENT DOCUMENTS 6,501,956 B1 * 12/2002 Weeren ............... H04M 3/4938
  455/414.2
6,701,358 B1 * 3/2004 Poisson ............... H04L 12/4675
  709/223

(Continued)

*Primary Examiner* — Ramy M Osman
(74) *Attorney, Agent, or Firm* — The Pattani Law Group

(57) ABSTRACT

A method for configuring a protocol in a virtual private network (VPN) service environment, the method including receiving, from a user device, device information associated with operation of the user device during an established VPN connection; configuring, based at least in part on the device information, a given VPN protocol from among a plurality of VPN protocols for utilization during the established VPN connection; and transmitting, to the user device, information associated with the given VPN protocol to enable the user device and a VPN server to utilize the given VPN protocol during the established VPN connection. Various other aspects are contemplated.

20 Claims, 5 Drawing Sheets

(56) References Cited

U.S. PATENT DOCUMENTS

| | | | | |
|---|---|---|---|---|
| 7,599,999 | B1* | 10/2009 | Armstrong | G06F 9/544 709/216 |
| 8,356,087 | B1* | 1/2013 | Miller | H04L 63/0272 709/223 |
| 8,566,926 | B1* | 10/2013 | Schnellbacher | G06F 13/00 726/4 |
| 9,038,162 | B2* | 5/2015 | Hagiu | G06F 21/42 713/168 |
| 9,356,821 | B1* | 5/2016 | Jagannathan | H04L 65/4084 |
| 11,076,027 | B1* | 7/2021 | Sharp | H04L 69/24 |
| 11,336,516 | B1* | 5/2022 | Birgiolas | H04L 41/5054 |
| 2002/0013815 | A1* | 1/2002 | Obradovich | H04L 51/42 715/744 |
| 2005/0138462 | A1* | 6/2005 | Hunt | H04L 69/40 714/10 |
| 2006/0041939 | A1* | 2/2006 | Schwartzman | H04L 63/08 726/15 |
| 2006/0184998 | A1* | 8/2006 | Smith | H04L 41/0856 726/3 |
| 2006/0230446 | A1* | 10/2006 | Vu | H04L 63/166 726/15 |
| 2007/0074283 | A1* | 3/2007 | Croak | H04L 63/164 726/15 |
| 2007/0157303 | A1* | 7/2007 | Pankratov | H04L 63/029 726/11 |
| 2009/0292909 | A1* | 11/2009 | Feder | H04L 67/303 713/1 |
| 2010/0153532 | A1* | 6/2010 | Ozawa | H04L 41/0813 709/223 |
| 2011/0145426 | A1* | 6/2011 | Miyajima | H04L 63/0272 709/230 |
| 2012/0096540 | A1* | 4/2012 | Hilgenkamp | H04L 12/4641 726/15 |
| 2012/0227102 | A1* | 9/2012 | Parla | H04L 63/18 726/15 |
| 2013/0108269 | A1* | 5/2013 | Kim | H04L 12/467 398/58 |
| 2013/0283377 | A1* | 10/2013 | Das | G06F 21/51 726/23 |
| 2014/0149559 | A1* | 5/2014 | Parviainen-Jalanko | H04L 63/0272 709/220 |
| 2014/0317720 | A1* | 10/2014 | Johnson | H04L 69/18 726/14 |
| 2015/0188949 | A1* | 7/2015 | Mahaffey | H04L 63/0272 726/1 |
| 2015/0207823 | A1* | 7/2015 | Mahbod | H04L 67/60 709/228 |
| 2015/0271257 | A1* | 9/2015 | Abramov | H04N 21/632 709/222 |
| 2015/0350256 | A1* | 12/2015 | Pauly | H04L 61/4511 709/227 |
| 2016/0210209 | A1* | 7/2016 | Verkaik | G06F 11/2033 |
| 2016/0359811 | A1* | 12/2016 | Chan | H04L 63/0272 |
| 2018/0041613 | A1* | 2/2018 | Lapidous | H04L 67/2876 |
| 2018/0048588 | A1* | 2/2018 | Beesley | H04L 63/0272 |
| 2019/0141078 | A1* | 5/2019 | Punadikar | H04L 63/0823 |
| 2020/0162580 | A1* | 5/2020 | Suresh | H04L 67/51 |
| 2020/0322274 | A1* | 10/2020 | Copley | H04L 45/026 |
| 2022/0014553 | A1* | 1/2022 | Dutta | H04L 69/322 |
| 2022/0166647 | A1* | 5/2022 | Norbutas | H04L 47/283 |
| 2023/0081806 | A1* | 3/2023 | Zaliauskas | H04L 63/0272 726/15 |
| 2023/0083991 | A1* | 3/2023 | Zaliauskas | H04L 63/0435 709/220 |

* cited by examiner

CONFIGURING A PROTOCOL IN A VIRTUAL PRIVATE NETWORK

CROSS REFERENCE

This application is a continuation of U.S. Non-Provisional patent application Ser. No. 17/472,672, filed on Sep. 12, 2021, and titled "Configuring A Protocol In A Virtual Private Network," the entire contents of which are incorporated herein by reference.

FIELD OF DISCLOSURE

Aspects of the present disclosure generally relate to a virtual private network (VPN), and more particularly to configuring a protocol in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger the encryption is.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method for configuring a protocol in a virtual private network (VPN) service environment, the method including receiving, from a user device, device information associated with operation of the user device during an established VPN connection; determining, based at least in part on the device information, a given VPN protocol from among a plurality of VPN protocols for utilization during the established VPN connection; and transmitting, to the user device, information associated with the given VPN protocol to enable the user device and a VPN server to utilize the given VPN protocol during the established VPN connection.

In another aspect, the present disclosure contemplates a device associated with a VPN, the device comprising a memory; and a processor communicatively coupled to the memory, the processor being configured to: receive, from a user device, device information associated with operation of the user device during an established VPN connection; determine, based at least in part on the device information, a given VPN protocol from among a plurality of VPN protocols for utilization during the established VPN connection; and transmit, to the user device, information associated with the given VPN protocol to enable the user device and a VPN server to utilize the given VPN protocol during the established VPN connection.

In another aspect, the present disclosure contemplates a non-transitory computer readable medium storing instructions, which when executed by a processor cause the processor to: receive, from a user device, device information associated with operation of the user device during an established VPN connection; determine, based at least in part on the device information, a given VPN protocol from among a plurality of VPN protocols for utilization during the established VPN connection; and transmit, to the user device, information associated with the given VPN protocol to enable the user device and a VPN server to utilize the given VPN protocol during the established VPN connection.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
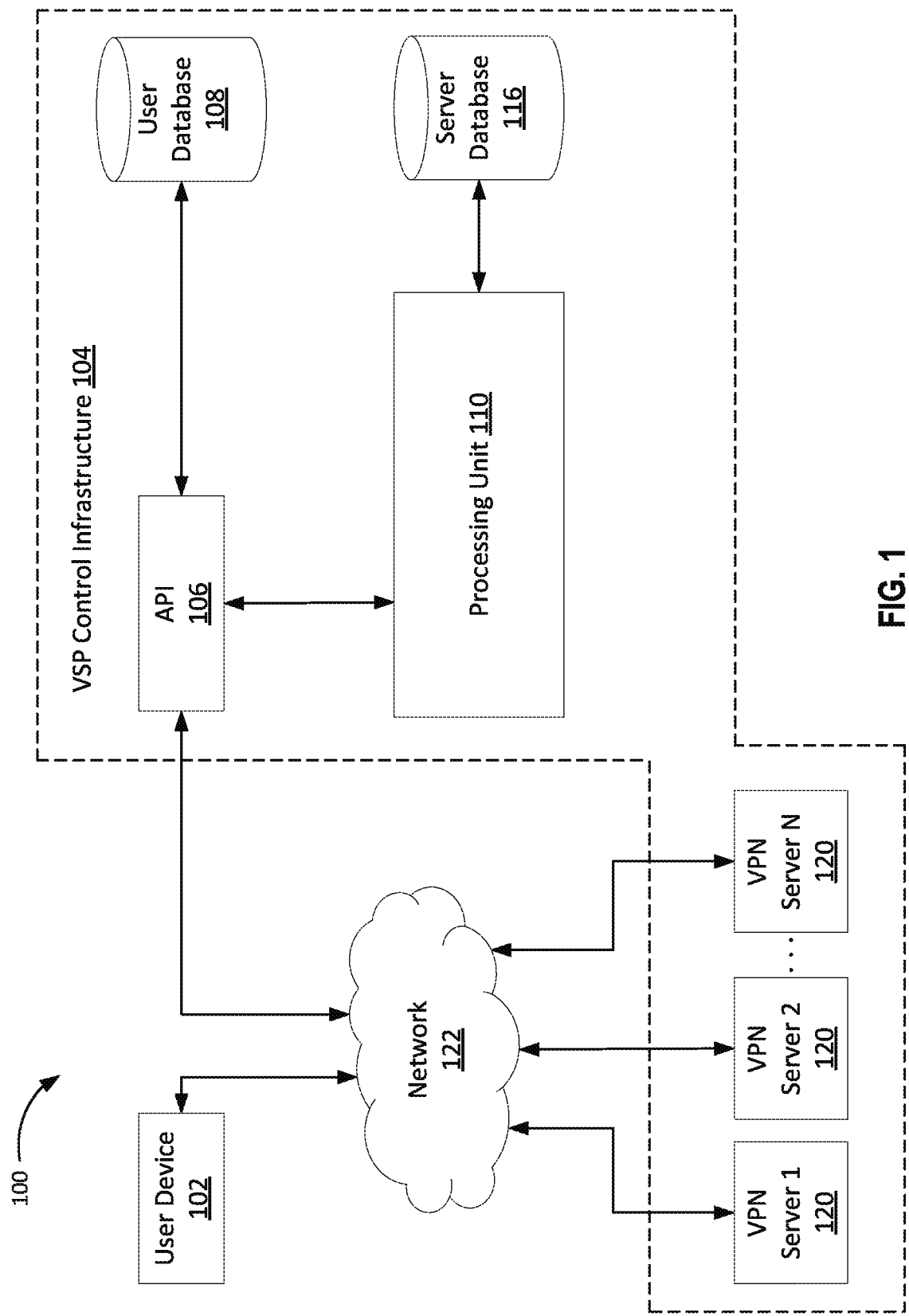

FIG. 1 is an illustration of an example system associated with configuring a protocol in a VPN, according to various aspects of the present disclosure.

Figure 2:
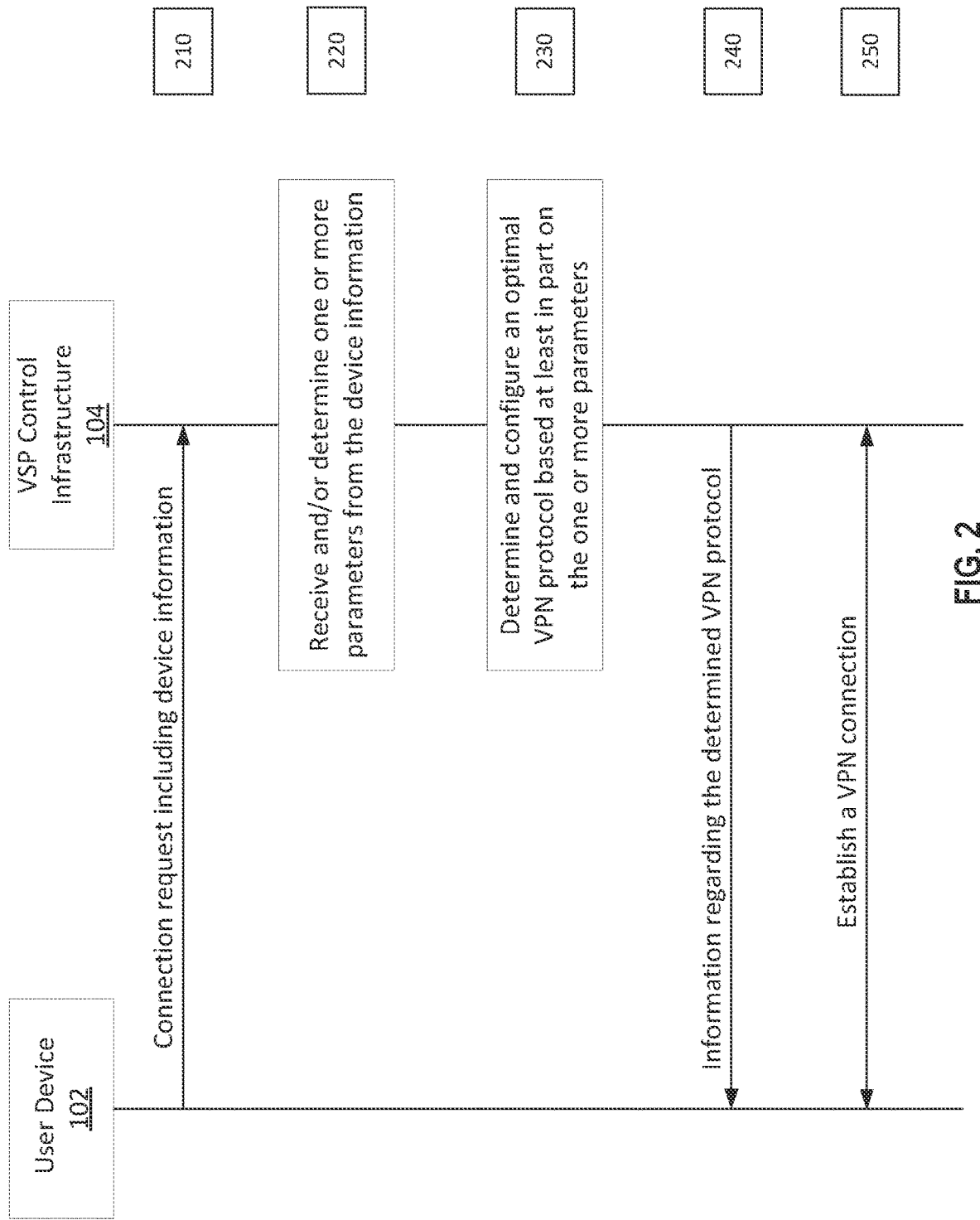

FIG. 2 is an illustration of an example flow associated with configuring a protocol in a VPN, according to various aspects of the present disclosure.

Figure 3:
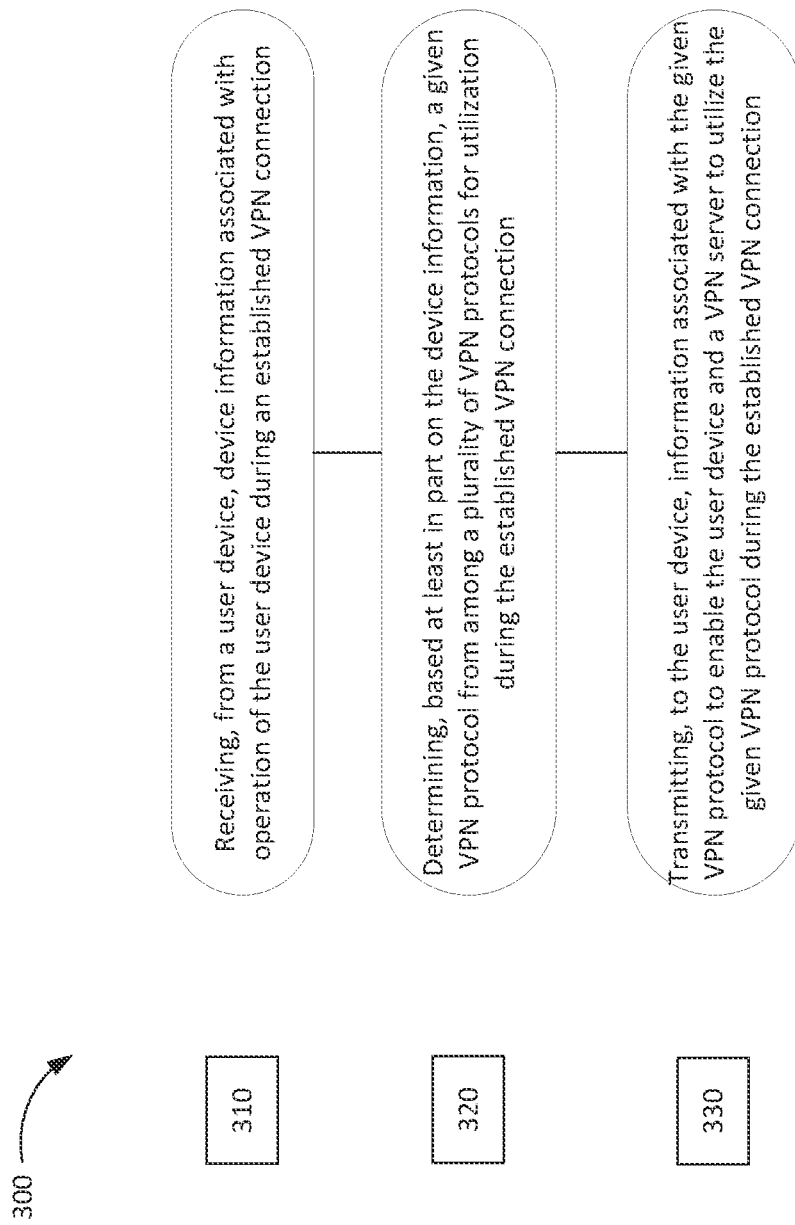

FIG. 3 is an illustration of an example process associated with configuring a protocol in a VPN, according to various aspects of the present disclosure.

Figure 4:
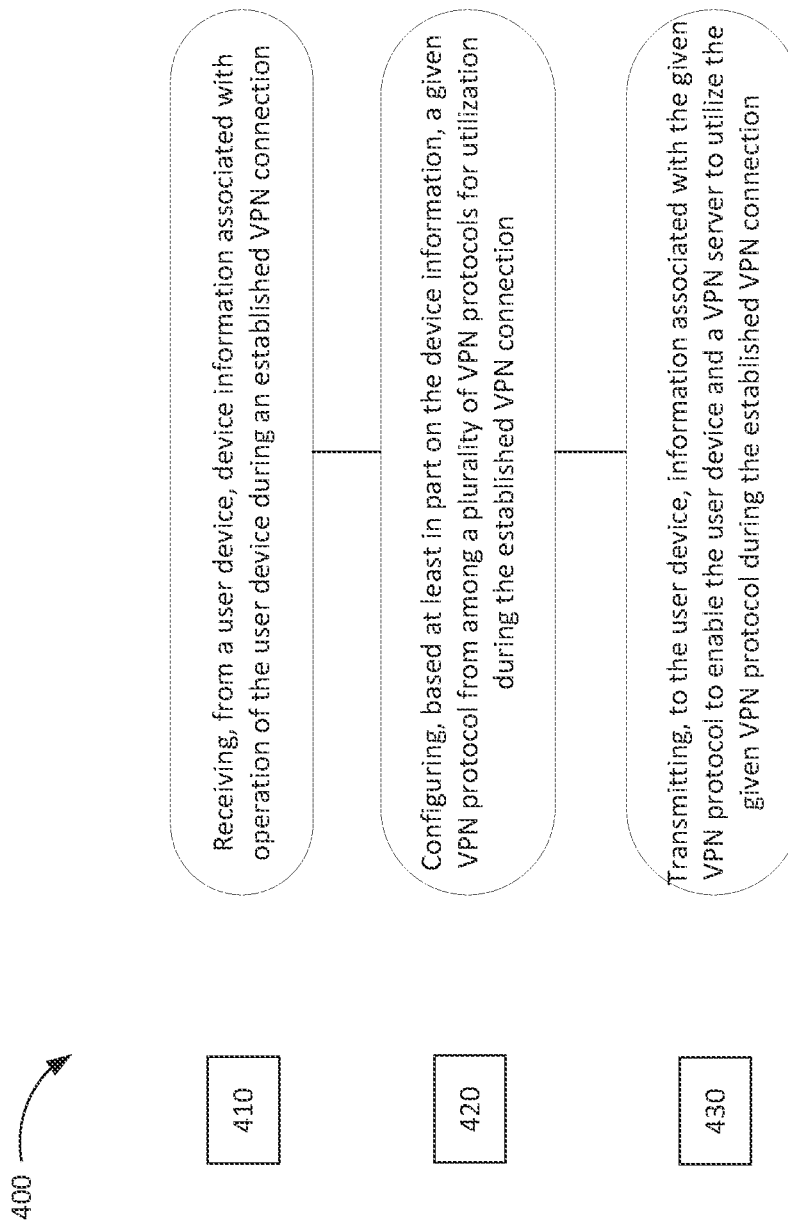

FIG. 4 is an illustration of an example process associated with configuring a protocol in a VPN, according to various aspects of the present disclosure.

Figure 5:
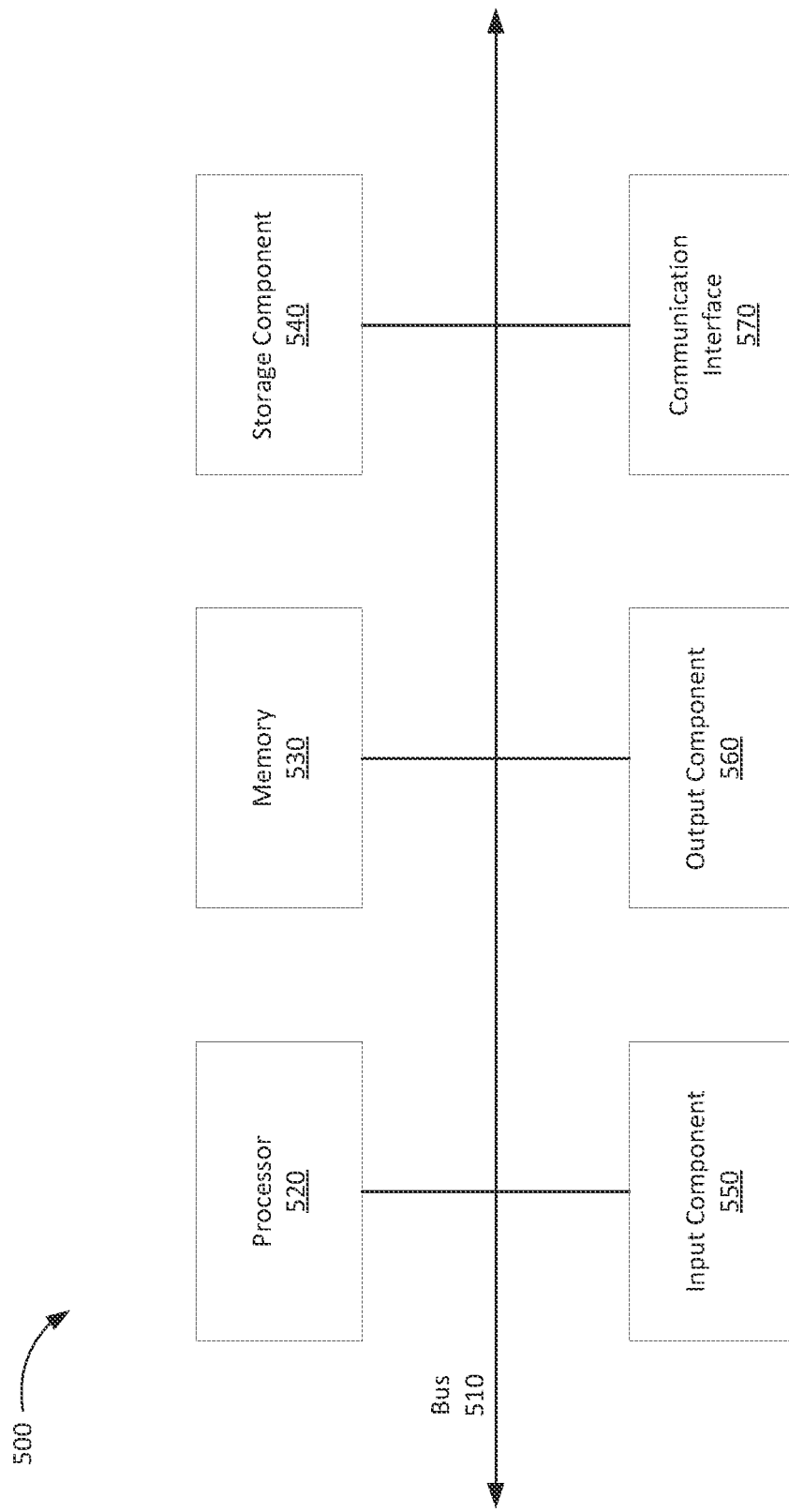

FIG. 5 is an illustration of example devices associated with configuring a protocol in a VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with configuring a protocol in a VPN, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 116, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may transmit an initiation request to establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine 112. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 116) included in the VSP control infrastructure 104 may further be associated with a controller/processor, a memory, a communication interface, or a combination thereof (e.g., FIG. 5). For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may request VPN services from a VSP control infrastructure. To request the VPN services, the user device may transmit, utilizing an installed client application, a connection request and/or an authentication request to an API associated with the VSP control infrastructure. Thereafter, the user device may undergo an authentication process involving the API and a database associated with the VSP control infrastructure. Once authenticated, the VSP control infrastructure may determine a VPN server for providing the VPN services to the user device. The user device may utilize the client application to transmit an initiation request for establishing a VPN connection with the VPN server. In the initiation request, the client application may indicate a VPN protocol to be utilized during the established VPN connection to, for example, encrypt and decrypt communicated data.

The client application may select, for example, a default VPN protocol having a default configuration to be utilized during the established VPN connection. In an example, the client application may select OpenVPN to be utilized during the established VPN connection. OpenVPN may allow the user device to utilize Transmission Control Protocol (TCP) communication or User Datagram Protocol (UDP) communication to securely communicate (e.g., transmit and/or receive) data. In another example, the client application may select IKEv2 to be utilized during the established VPN connection. IKEv2 may allow the user device and the VPN server to establish a fast and secure VPN connection. IKEv2 may also allow the established VPN connection to be stable and dependable as the user device moves from one internet connection to another (e.g., Wi-Fi to mobile data, mobile data to Wi-Fi, etc.). In yet another example, the client application may select Wireguard to be utilized during the established VPN connection. Wireguard has a lean architecture and may enable faster VPN connections with respect to OpenVPN or IKEv2.

Selection of the default VPN protocol having the default configuration for utilization during the established VPN connection may not be optimal. In an example, a set-up process associated with setting up OpenVPN to allow the user device to use TCP communication or UDP communication may involve a threshold amount of complexity and may consume a threshold amount of user device resources (e.g., storage resources, processing resources, etc.), which the user device may not have available. In another example, although IKEv2 may allow the user device and the VPN server to establish a fast and secure VPN connection while the user device moves from one Internet connection to another, IKEv2 may not be compatible with a plurality of operating systems such as, for example, the iOS operating system, the Mac operating system, the Android operating system, or the like that the user device may utilize to operate. As such, the user device may have to expend resources (e.g., storage resources, processing resources, etc.) to configure IKEv2, which resources the user device may not have available. In yet another example, although Wireguard has a lean architecture and may enable faster VPN connections, Wireguard may fail to provide the user device with adequate anonymity and to adequately mitigate private information associated with the user device becoming compromised. In this case, the user device may get damaged.

Because the default VPN protocol may not be optimal, the user device may fail to adequately receive the VPN services from the VPN server during the established VPN connection. As a result, the user device may have to disconnect the established VPN connection and re-establish a new VPN connection to utilize a more suitable VPN protocol. Such disconnecting of the established VPN connection and establishing of the new VPN connection may inefficiently consume user device resources (e.g., processing resources, memory resources, power consumption resources, battery life, or the like) and resources associated with the VPN (computational resources, network bandwidth, management resources, processing resources, memory resources, or the like) that can otherwise be used to perform suitable tasks associated with the VPN. Additionally, a delay may be introduced in providing the VPN services to the user device.

Various aspects of systems and techniques discussed in the present disclosure enable configuring a protocol in a VPN. In some aspects, a VSP control infrastructure may select and configure a VPN protocol to be utilized during an established VPN connection between a user device and a VPN server. The VSP control infrastructure may receive device information in or along with a connection request from the user device. The device information may indicate one or more parameters associated with operation of the user device during the established VPN connection. In some aspects, the VSP control infrastructure may determine the one or more parameters associated with operation of the user device from the device information. Based at least in part on the device information, the VSP control infrastructure may select and configure a VPN protocol to be utilized during the established VPN connection. In some aspects, the VSP control infrastructure may select a VPN protocol, from among a plurality of VPN protocols, based at least in part on the one or more parameters associated with operation of the user device during the established VPN connection. Further, the VSP control infrastructure may configure the selected VPN protocol based at least in part on the one or more parameters for optimal utilization during the established VPN connection. In this way, the VSP control infrastructure may increase a likelihood of the user device receiving one or more VPN services after establishing a VPN connection with the VPN server. This may enable the user device and the VPN server to avoid disconnecting an established VPN connection and re-establishing a new VPN connection, thereby enabling conservation and efficient utilization of user device resources (e.g., processing resources, memory resources, power consumption resources, battery life, or the like) and resources associated with the VPN (computational resources, network bandwidth, management resources, processing resources, memory resources, or the like) for more suitable tasks associated with the VPN. Further, a delay in providing the one or more VPN services to the user device may be avoided.

In some aspects, a processor (e.g., processing unit 110, processor 520, etc.) associated with the VSP control infrastructure may receive, from a user device, device information associated with operation of the user device during an established VPN connection; determine, based at least in part on the device information, a given VPN protocol from among a plurality of VPN protocols to be utilized during the established VPN connection; and transmit, to the user device, information associated with the given VPN protocol to enable the user device and a VPN server to utilize the given VPN protocol during the established VPN connection.

FIG. 2 is an illustration of an example flow associated with configuring a protocol in a VPN, according to various aspects of the present disclosure. FIG. 2 shows a user device 102 in communication with a VSP control infrastructure 104. In some aspects, the user device 102 and the VSP control infrastructure 104 may communicate over a network (e.g., network 122). In some aspects, the requesting user device 102 may utilize an installed client application to communicate with an API (e.g., API 106) associated with the VSP control infrastructure 104.

As shown by reference numeral 210, the user device 102 may transmit a connection request to the VSP control infrastructure 104 for purposes of establishing a VPN connection with a VPN server 120 associated with the VSP control infrastructure 104 and receiving a VPN service. The connection request may include a request for information (e.g., entry IP address) associated with the VPN server 120. In some aspects, the connection request may include device information associated with operation of the user device 102 during the established VPN connection. Additionally, or alternatively, the device information may indicate a nature of a VPN service to be received by the user device 102 during the established VPN connection. In some aspects, the user device 102 may transmit the device information in a separate communication at substantially the same time as the connection request.

In some aspects, the VSP control infrastructure 104 may provide the client application to be installed on the user device 102. The client application may enable the user device 102 to receive device information and to transmit the connection request and the device information to the VSP control infrastructure 104. The client application may include a graphical interface to receive device information via a local input interface (e.g., touch screen, keyboard, mouse, pointer, etc.) associated with the user device 102. The device information may be received via text input or via a selection from among a plurality of options (e.g., pull down menu, etc.). In some aspects, the client application may activate and/or enable, at a time associated with transmitting the connection request, the graphical interface for receiving the device information. For instance, the client application may cause a screen (e.g., local screen) associated with the user device 102 to display, for example, a pop-up message to request entry of the device information before or at a time of transmitting the connection request. Further, the client application may enable transmission of the device information to the VSP control infrastructure 104 in association with the connection request. In one example, the client application may enable the device information to be included within the connection request or may enable transmission of the device information in a separate communicate at substantially the same time as transmission of the connection request. In this way, the client application may enable the VSP control infrastructure 104 to receive device information prior to establishment of the VPN connection so that the VSP control infrastructure 104 may make a more informed determination regarding an optimal VPN protocol (e.g., VPN protocol that is optimal for utilization during the established VPN connection). The VSP control infrastructure 104 may receive the device information in the connection request or via the separate communication.

As shown by reference numeral 220, the VSP control infrastructure 104 may receive and/or determine one or more parameters from the device information. In an example, the device information may indicate a VPN service that the user device 102 may receive during an established VPN connection. For instance, the device information may indicate that the user device 102 may stream multimedia content, upload and download a threshold amount of data to a remote server, and/or play online games and interact with other players. Based at least in part on such device information, the VSP control infrastructure 104 may determine that a fast and stable VPN protocol may be optimal for utilization during the established VPN connection. As a result, as shown by reference numeral 230, the VSP control infrastructure 104 may select and/or determine that the IKEv2 protocol is to be utilized during the established VPN connection.

Further, the VSP control infrastructure 104 may configure the IKEv2 protocol. In an example, based at least in part on the device information such as, for example, an IP address of the user device 102, the VSP control infrastructure may determine a type of Internet connection to be utilized by the user device 102 to access the Internet during the established VPN connection. For instance, the VSP control infrastructure 104 may determine that the user device 102 may utilize, for example, a Wi-Fi connection to access the Internet during the established VPN connection or that the user device 102 may utilize, for example, a mobile data connection to access the Internet during the established VPN connection. Based at least in part on such determination, the VSP control infrastructure 104 may configure the selected IKEv2 protocol to operate using a given frequency of a keep-alive ping. For instance, when the VSP control infrastructure 104 determines that the user device may utilize the Wi-Fi connection, the VSP control infrastructure 104 may configure the selected IKEv2 protocol to operate using a first frequency of a keep-alive ping. Alternatively, when the VSP control infrastructure 104 determines that the user device may use the mobile data connection, the VSP control infrastructure 104 may configure the selected IKEv2 protocol to operate using a second frequency of a keep-alive ping, the second frequency being faster than the first frequency. In some aspects, the first frequency may be adequate when the user device 102 utilizes the Wi-Fi connection and the second frequency may be adequate when the user device 102 utilizes the mobile data connection. In this way, by configuring the selected IKEv2 protocol with an appropriate keep-alive ping frequency, the VSP control infrastructure 104 may enable conservation of VPN resources (e.g., management resources, processing resources, power consumption, storage resources, etc.) and of user device resources (e.g., processing resources, power consumption (battery life), stories resources, etc.) while conducting operations related to the keep-alive ping.

In another example, the device information may indicate that the user device 102 may communicate data using TCP communications and/or UDP communications during the established VPN connection. Based at least on such device information, the VSP control infrastructure 104 may determine that a stable VPN protocol capable of enabling the user device 102 to securely communicate data using TCP communications and/or UDP communications may be optimal for utilization during the established VPN connection. As a result, as shown by reference numeral 230, the VSP control infrastructure 104 may select and/or determine that the OpenVPN protocol is to be utilized during the established VPN connection.

Further, the VSP control infrastructure 104 may configure the selected OpenVPN protocol. In an example, based at least in part on the device information such as, for example, a device identifier of the user device 102, the VSP control infrastructure may determine a type of operating system utilized by the user device 102. For instance, the VSP control infrastructure 104 may determine that the user device 102 may utilize, for example, the Windows operating system during the established VPN connection or that the user device 102 may utilize, for example, the iOS or the Mac operating system during the established VPN connection. Based at least in part on such determination, the VSP control infrastructure 104 may configure the selected OpenVPN protocol for utilization during the established VPN network. For instance, when the VSP control infrastructure 104 determines that the user device 102 may utilize the Windows operating system, the VSP control infrastructure 104 may configure the selected OpenVPN protocol with settings optimal for operation with the Windows operating system. Alternatively, when the VSP control infrastructure 104 determines that the user device may use the iOS or the Mac operating system, the VSP control infrastructure 104 may configure the selected OpenVPN protocol with settings optimal for operation with the iOS or the Mac operating system. In this way, by configuring the selected OpenVPN protocol to work optimally with the operating system to be utilized by the user device 102 during the established VPN connection, the VSP control infrastructure 104 may facilitate communication during the established VPN connection and enable conservation of VPN resources (e.g., management resources, processing resources, power consumption, storage resources, etc.) and of user device resources (e.g., processing resources, power consumption (battery life), stories resources, etc.) while conducting operations related to providing the VPN service.

In yet another example, the device information may indicate that the user device 102 may be a smart device (e.g., an Internet-of-things (IoT) device) and may communicate ultra-reliable low latency (URLLC) data. Based at least on such device information, the VSP control infrastructure 104 may determine that a fast VPN protocol capable of enabling the user device 102 to adequately and reliably communicate the URLLC data may be optimal for utilization during the established VPN connection. As a result, as shown by reference numeral 230, the VSP control infrastructure 104 may select and/or determine that the Wireguard protocol is to be utilized during the established VPN connection.

Further, the VSP control infrastructure 104 may configure the selected Wireguard protocol. In an example, based at least in part on the device information such as, for example, an IP address of the user device 102, the VSP control infrastructure may determine a type of Internet connection to be utilized by the user device 102 to access the Internet during the established VPN connection. For instance, the VSP control infrastructure 104 may determine that the user device 102 may utilize, for example, a Wi-Fi connection to access the Internet during the established VPN connection or that the user device 102 may utilize, for example, a mobile data connection to access the Internet during the established VPN connection. Based at least in part on such determination, the VSP control infrastructure 104 may configure the selected Wireguard protocol to operate using a given frequency of a keep-alive ping. When the VSP control infrastructure 104 determines that the user device may utilize the Wi-Fi connection, the VSP control infrastructure 104 may configure the selected IKEv2 protocol to operate using a first frequency of a keep-alive ping. Alternatively, when the VSP control infrastructure 104 determines that the user device may use the mobile data connection, the VSP control infrastructure 104 may configure the selected Wireguard protocol to operate using a second frequency of a keep-alive ping, the second frequency being faster than the first frequency. In some aspects, the first frequency may be adequate when the user device 102 utilizes the Wi-Fi connection and the second frequency may be adequate when the user device 102 utilizes the mobile data connection. In this way, the VSP control infrastructure 104 may enable conservation of VPN resources (e.g., management resources, processing resources, power consumption, storage resources, etc.) and of user device resources (e.g., processing resources, power consumption (battery life), stories resources, etc.) while conducting operations related to the keep-alive ping.

In some aspects, the device information may also include condition information indicating conditions associated with the user device 102 during the established VPN connection. Such condition information may indicate a static condition and/or a dynamic condition associated with the user device 102. A static condition may include, for example, a type of network connection utilized by the user device 102, a type of operating system utilized by the user device 102, a type of device associated with the user device 102, a type of internet service provider (ISP) providing internet-based services to the user device 102, or the like.

In addition or in combination, the device information may include static data (e.g., acceptance of the terms of services, device type and model, operating system type and version, identification (e.g. an e-mail address), frequency, intervals, and schedule at which static parameters are changed (e.g., geolocation or IP type), dynamic parameters (e.g., time seen, session duration and timestamps, timestamps of idleness, current total traffic, traffic per day or other period of time, response time, latency, target, battery life, and others), and/or aggregated dynamic parameters over any period of time (e.g., average speed, average session duration and timestamps, average traffic, average response time, average latency, variations in which median and percentile groups are used instead of average values, and others) in any combination and with any weights associated with the parameters.

The type of network connection may include, for example, a switching connection or a stable connection. The switching connection may include the user device 102 connecting to a network (e.g., network 122) via mobile technology (e.g., Code Division Multiple Access (CDMA), Global System for Mobiles (GSM), or the like) and switching to connect to the network via immobile technology (e.g., ethernet connection, Wi-Fi connection, or the like), and vice versa. The switching connection may also include the user device 102 connecting to the network using the mobile technology and moving about the environment such that the user device 102 is serviced by a plurality of cells (e.g., base stations) during the established VPN connection resulting in changes in an IP address associated with the user device 102. The stable connection may include the user device 102 connecting to the network via the immobile technology. The VSP control infrastructure may determine the optimal VPN protocol based at least in part on the type of connection. For instance, when the VSP control infrastructure 104 determines that the user device 102 may utilize a switching connection to communicate with a VPN server during the established VPN connection, the VSP control infrastructure may select and/or determine that the IKEv2 protocol, which may more compatible to a switching connection as compared to other VPN protocols, is to be utilized during the established VPN connection. Similarly, when the VSP control infrastructure 104 determines that the user device 102 may utilize a stable connection to communicate with a VPN server during the established VPN connection, the VSP control infrastructure may select and/or determine that the OpenVPN protocol or the Wireguard protocol is to be utilized during the established VPN connection.

Additionally, or alternatively, the VSP control infrastructure may determine the optimal VPN protocol based at least in part on the type of operating system. In some aspects, the type of operating system may include, for example, an iOS operating system, a Mac operating system, an Android operating system, a Windows operating system, or the like. In an example, when the VSP control infrastructure 104 determines that the user device 102 may operate utilizing a first type of operating system while communicating with a VPN server during the established VPN connection, the VSP control infrastructure may determine a VPN protocol optimal for the first type of operating system as the optimal VPN protocol. For instance, based at least in part on determining that the user device 102 may utilize, for example, the iOS operating system or the Mac operating system, the VSP control infrastructure may select and/or determine that the IKEv2 protocol, which is native to the iOS operating system and/or the Mac operating system, is to be utilized during the established VPN connection. Similarly, when the VSP control infrastructure 104 determines that the user device 102 may operate utilizing a second type of operating system while communicating with a VPN server during the established VPN connection, the VSP control infrastructure may determine a VPN protocol optimal for the second type of operating system as the optimal VPN server 120. For instance, based at least in part on determining that the user device 102 may utilize, for example, the Windows operating system, the VSP control infrastructure may select and/or determine that the IKEv2 protocol, configured with a Windows-compatible configuration, is to be utilized during the established VPN connection. Similarly, when the VSP control infrastructure 104 determines that the user device 102 may operate utilizing a third type of operating system while communicating with a VPN server during the established VPN connection, the VSP control infrastructure may determine a VPN protocol optimal for the third type of operating system as the optimal VPN server 120. For instance, based at least in part on determining that the user device 102 may utilize, for example, the Android operating system, the VSP control infrastructure may select and/or determine that the Wireguard protocol or the OpenVPN protocol, configured with an Android-compatible configuration, is to be utilized during the established VPN connection.

The VSP control infrastructure may determine the optimal VPN protocol based at least in part on the ISP providing internet-based services to the user device 102. For instance, when the VSP control infrastructure 104 determines that a first ISP may be providing internet-based services to the user device 102 during the established VPN connection, the VSP control infrastructure may determine a VPN protocol compatible with infrastructure associated with the first ISP as the optimal VPN protocol. Similarly, when the VSP control infrastructure 104 determines that a second ISP may be providing internet-based services to the user device 102 during the established VPN connection, the VSP control infrastructure may determine a VPN protocol compatible with infrastructure associated with the second ISP as the optimal VPN protocol.

The VSP infrastructure may also factor one or more dynamic conditions while determining the optimal VPN protocol. A dynamic condition associated with the user device 102 may include, for example, a speed of a network connection utilized by the user device 102 during the established VPN connection, or the like. For instance, when the VSP control infrastructure 104 determines that the speed of the network connection during the established VPN connection fails to satisfy a threshold network speed (e.g., speed of network connection is greater than or equal to the threshold network speed), the VSP control infrastructure may determine a fast VPN protocol such as the Wireguard protocol as the optimal VPN protocol. Similarly, when the VSP control infrastructure 104 determines that the speed of the network connection during the established VPN connection satisfies the threshold network speed (e.g., speed of network connection is less than the threshold network speed), the VSP control infrastructure may determine a stable VPN protocol such as the OpenVPN protocol as the optimal VPN protocol.

The dynamic condition may also include a preference of the user device 102 to utilize a VPN protocol that is optimized for particular tasks such as, for example, streaming multimedia content. In some aspects, the preference of the user device 102 may indicate that the user device 102 may receive the VPN service utilizing a fastest available VPN protocol, or a most stable protocol, etc. The VSP infrastructure may factor the preferences of the user device 102 while determining the optimal VPN protocol.

In some aspects, the VSP control infrastructure 104 may determine the optimal VPN protocol or the user device 102 based on a geographical location of the user device 102. For instance, the VSP control infrastructure 104 may determine the optimal VPN protocol based at least in part on determining local conditions associated with the user device 102. In an example, the VSP control infrastructure 104 may determine, for example, the OpenVPN protocol as the optimal VPN protocol based at least in part on determining that the user device 102 is located in a first geographical location. Such determination by the VSP control infrastructure 104 may be based at least in part on an observed performance of different VPN protocols on user devices located in the first geographical location. In some aspects, the first geographical location may be associated with a building, a town, a city, a state, a country, or the like.

Based at least in part on determining the optimal VPN protocol based on one or more of the above factors, as shown by reference numeral 240, the VSP control infrastructure 104 may transmit information regarding the optimal VPN protocol to the user device 102. In some aspects, the information may include an identification of the optimal VPN protocol and/or configuration settings associated with the selected/determined optimal VPN protocol. The user device 102 may utilize the information associated with the optimal VPN protocol to configure the user device 102 to establish a VPN connection with a VPN server 120. In this way, the VSP control infrastructure 104 may enable the user device 102 and the VPN server 120 to utilize the optimal VPN protocol during the established VPN connection. As shown by reference numeral 250, the VPN server 120 and the user device 102 may establish a VPN connection during which the VPN server 120 may provide the VPN service to the user device 102.

By utilizing the above systems and techniques associated with configuring a protocol in a VPN, a client application may enable a VSP control infrastructure to receive device information prior to establishment of a VPN connection so that the VSP control infrastructure may make a more informed determination regarding an optimal VPN protocol. In this way, the VSP control infrastructure may increase a likelihood of the user device receiving the one or more VPN services after establishing a VPN connection with the optimal VPN server. As a result, the user device and the VSP control infrastructure may avoid expending resources to disconnect an established VPN connection and to re-establish a new VPN connection, thereby enabling conservation and efficient utilization of user device resources (e.g., processing resources, memory resources, power consumption resources, battery life, or the like) and resources associated with the VPN (computational resources, network bandwidth, management resources, processing resources, memory resources, or the like) for more suitable tasks associated with the VPN. Additionally, a delay in providing the one or more VPN services to the user device may be avoided.

Although the discussed VPN protocols are common in contemporary use, additional protocols may be considered in the selection process. For example, IP in IP (Protocol 4): IP in IPv4/IPv6; SIT/IPv6 (Protocol 41): IPv6 in IPv4/IPv6; GRE (Protocol 47): Generic Routing Encapsulation; SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network, and similar.

IP in IP (Protocol 4)—refers to a tunneling protocol that encapsulates one IP packet in another IP packet. In some aspects, IP in IP tunnels with all possible combinations of IPv4 and IPv6 such as, for example, IPv4 over IPv4, IPv6 over IPv4, IPv4 over IPv6, and/or IPv6 over IPv6 are supported.

SIT/IPv6 (Protocol 41)—is a transition mechanism and a tunneling protocol that encapsulates IPv6 packets on specially configured IPv4 links. An IPv6 packet may be preceded by an IPv4 packet header. It is a simple internet transition (SIT) and known as Protocol 41.

GRE (Protocol 47)—where GRE is an acronym for Generic Routing Encapsulation. It is a tunneling protocol that can encapsulate a wide variety of network layer protocols inside virtual point-to-point links or point-to-multipoint links over an Internet Protocol network.

SSTP (TCP port 443)—where SSTP is an acronym for Secure Socket Tunneling Protocol. It is a form of VPN tunnel that provides a mechanism to transport point to point traffic through a secure socket layer channel. The use of socket layer over TCP port 443 allows SSTP to pass through virtually all firewalls and proxy servers except for authenticated web proxies.

IPsec (Protocol 50 and 51)—where IPsec stands for Internet protocol security. It is a secure network protocol suite that authenticates and encrypts the packets of data to provide secure encrypted communication between two computers over an internet network. Protocol 50 is known as encapsulating security payload and it is a member of the IPsec protocol suite. It provides origin authenticity through source authentication, data integrity through hash functions and confidentiality through encryption protection for IP packets. Protocol 50 also supports encryption-only and authentication-only configurations. Protocol 51 is known as the authentication header and also a member of the IPsec protocol suite. Protocol 51 ensures connectionless integrity by using a hash algorithm and a secret shared key. It guarantees the data origin by authenticating IP packets.

L2TP (Protocol 115)—where L2TP is an acronym for Layer 2 Tunneling Protocol, it is a tunneling protocol used to support VPN Server 104 or as part of the delivery of services by internet service providers. It does not provide any encryption or confidentiality by itself. Rather, it relies on an encryption protocol that it passes within the tunnel to provide privacy.

VXLAN (UDP port 4789)—where VXLAN stands for Virtual Extensible Local Area Network, it is a network virtualization technology that uses a VLAN-like encapsulation technique to encapsulate OSI layer 2 Ethernet frames within layer 4 UDP datagrams As indicated above, FIG. 2 is provided as an example. Other examples may differ from what is described with regard to FIG. 2.

FIG. 3 is an illustration of an example process 300 associated with configuring a protocol in a VPN, according to various aspects of the present disclosure. In some aspects, the process 300 may be performed by a processor/controller (e.g., processing unit 110 and/or processor 520) associated with a VSP control infrastructure (e.g., VSP control infrastructure 104). As shown by reference numeral 310, process 300 includes receiving, from a user device, device information associated with operation of the user device during an established VPN connection. For instance, the VSP control infrastructure may utilize an associated communication interface (e.g., communication interface 570) along with the associated processor/controller to receive, from a user device, device information associated with operation of the user device during an established VPN connection, as discussed elsewhere herein.

As shown by reference numeral 320, process 300 includes determining, based at least in part on the device information, a given VPN protocol from among a plurality of VPN protocols for utilization during the established VPN connection. For instance, the VSP control infrastructure may utilize the associated processor/controller to determine, based at least in part on the device information, a given VPN protocol from among a plurality of VPN protocols for utilization during the established VPN connection, as discussed elsewhere herein.

As shown by reference numeral 330, process 300 includes transmitting, to the user device, information associated with the given VPN protocol to enable the user device and a VPN server to utilize the given VPN protocol during the established VPN connection. For instance, the VSP control infrastructure may utilize the communication interface (e.g., communication interface 570) and the associated processor/controller to transmit, to the user device, information associated with the given VPN protocol to enable the user device and a VPN server to utilize the given VPN protocol during the established VPN connection, as discussed elsewhere herein.

Process 300 may include additional aspects, such as any single aspect or any combination of aspects described below and/or in connection with one or more other processes described elsewhere herein.

In a first aspect, in process 300, receiving the device information includes receiving the device information prior to the VPN connection being established.

In a second aspect, alone or in combination with the first aspect, in process 300, receiving the device information includes receiving the device information in a connection request transmitted by the user device.

In a third aspect, alone or in combination with the first through second aspects, in process 300, the device information indicates a condition associated with operation of the user device during the established VPN connection.

In a fourth aspect, alone or in combination with the first through third aspects, process 300 includes configuring, based at least in part on the device information, the given VPN protocol for utilization during the established VPN connection.

In a fifth aspect, alone or in combination with the first through fourth aspects, process 300 includes configuring the given VPN protocol based at least in part on condition information indicating a condition associated with operation of the user device during the established VPN connection.

In a sixth aspect, alone or in combination with the first through fifth aspects, in process 300, determining the given VPN protocol includes determining a parameter associated with operation of the user device during the established VPN connection.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with configuring a protocol in a VPN, according to various aspects of the present disclosure. In some aspects, the process 400 may be performed by a processor/controller (e.g., processing unit 110 and/or processor 520) associated with a VSP control infrastructure (e.g., VSP control infrastructure 104). As shown by reference numeral 410, process 400 includes receiving, from a user device, device information associated with operation of the user device during an established VPN connection. For instance, the processor may utilize a communication interface (e.g., communication interface 570) to receive, from a user device, device information associated with operation of the user device during an established VPN connection, as discussed elsewhere herein.

As shown by reference numeral 420, process 400 includes configuring, based at least in part on the device information, a given VPN protocol from among a plurality of VPN protocols for utilization during the established VPN connection. For instance, the processor may configure, based at least in part on the device information, a given VPN protocol from among a plurality of VPN protocols for utilization during the established VPN connection, as discussed elsewhere herein.

As shown by reference numeral 430, process 400 includes transmitting, to the user device, information associated with the given VPN protocol to enable the user device and a VPN server to utilize the given VPN protocol during the established VPN connection. For instance, the processor may utilize the communication interface to transmit, to the user device, information associated with the given VPN protocol to enable the user device and a VPN server to utilize the given VPN protocol during the established VPN connection, as discussed elsewhere herein.

Process 400 may include additional aspects, such as any single aspect or any combination of aspects described below and/or in connection with one or more other processes described elsewhere herein.

In a first aspect, in process 400, configuring the given VPN protocol includes configuring a VPN protocol determined as an optimal VPN protocol to be utilized during the established VPN connection based at least in part on the device information.

In a second aspect, alone or in combination with the first aspect, in process 400, configuring the given VPN protocol includes configuring the given VPN protocol based at least in part on a condition associated with operation of the user device during the established VPN connection.

In a third aspect, alone or in combination with the first through second aspects, in process 400, configuring the given VPN protocol includes configuring the given VPN protocol based at least in part on a geographic location of the user device during the established VPN connection.

In a fourth aspect, alone or in combination with the first through third aspects, in process 400, wherein receiving the device information includes receiving the device information prior to the VPN connection being established.

In a fifth aspect, alone or in combination with the first through fourth aspects, in process 400, wherein receiving the device information includes receiving the device information in a connection request transmitted by the user device.

In a sixth aspect, alone or in combination with the first through fifth aspects, in process 400, wherein the device information indicates a condition associated with operation of the user device during the established VPN connection.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of example devices 500, according to various aspects of the present disclosure. In some aspects, the example devices 500 may form part of or implement the systems, environments, infrastructures, components, or the like described elsewhere herein (e.g., FIG. 1 and/or FIG. 2) and may be used to perform the processes described with respect to FIGS. 3 and 4. The example devices 500 may include a universal bus 510 communicatively coupling a processor 520, a memory 530, a storage component 540, an input component 550, an output component 560, and a communication interface 570.

Bus 510 may include a component that permits communication among multiple components of a device 500. Processor 520 may be implemented in hardware, firmware, and/or a combination of hardware and software. Processor 520 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 520 may include one or more processors capable of being programmed to perform a function. Memory 530 may include a random access memory (RAM), a read only memory (ROM), and/or another type of dynamic or static storage device (e.g., a flash memory, a magnetic memory, and/or an optical memory) that stores information and/or instructions for use by processor 520.

Storage component 540 may store information and/or software related to the operation and use of a device 500. For example, storage component 540 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 may include a component that permits a device 500 to receive information, such as via user input (e.g., a touch screen display, a keyboard, a keypad, a mouse, a button, a switch, and/or a microphone). Additionally, or alternatively, input component 550 may include a component for determining location (e.g., a global positioning system (GPS) component) and/or a sensor (e.g., an accelerometer, a gyroscope, an actuator, another type of positional or environmental sensor, and/or the like). Output component 560 may include a component that provides output information from device 500 (via, for example, a display, a speaker, a haptic feedback component, an audio or visual indicator, and/or the like).

Communication interface 570 may include a transceiver-like component (e.g., a transceiver, a separate receiver, a separate transmitter, and/or the like) that enables a device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, and/or the like.

A device 500 may perform one or more processes described elsewhere herein. A device 500 may perform these processes based on processor 520 executing software instructions stored by a non-transitory computer-readable medium, such as memory 530 and/or storage component 540. As used herein, the term "computer-readable medium" may refer to a non-transitory memory device. A memory device may include memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 5 are provided as an example. In practice, a device 500 may include additional components, fewer components, different components, or differently arranged components than those shown in FIG. 5. Additionally, or alternatively, a set of components (e.g., one or more components) of a device 500 may perform one or more functions described as being performed by another set of components of a device 500.

As indicated above, FIG. 5 is provided as an example. Other examples may differ from what is described with regard to FIG. 5.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for configuring a protocol in a virtual private network (VPN) service environment, the method comprising:

receiving, at an infrastructure device from a user device prior to a VPN connection being established between the user device and a VPN server, information indicating a type of connection to be utilized by the user device to access a network during the VPN connection after the VPN connection is established with the VPN server, the type of connection including an immobile connection or a mobile wireless connection to access the network;

configuring, by the infrastructure device based at least in part on the indicated type of connection, a given VPN protocol from among a plurality of VPN protocols to be utilized during an established VPN connection with the VPN server; and transmitting, by the infrastructure device to the user device, information associated with the given VPN protocol to enable the user device and the VPN server to utilize the given VPN protocol during the established VPN connection with the VPN server, wherein the user device is to utilize the indicated type of connection to access the Internet during the established VPN connection with the VPN server.

2. The method of claim 1, wherein configuring the given VPN protocol includes configuring a VPN protocol, other than a default VPN protocol, as the given VPN protocol.

3. The method of claim 1, wherein configuring the given VPN protocol includes configuring a VPN protocol that is determined to be an optimal VPN protocol for providing a VPN service to be received by the user device during the VPN connection, the VPN service being indicated by the information.

4. The method of claim 1, wherein the information includes one or more parameters indicating an operation of the user device during the established VPN connection.

5. The method of claim 1, wherein receiving the information includes receiving one or more parameters indicating a mode of operation of the user device during the VPN connection.

6. The method of claim 1, wherein configuring the given VPN protocol includes configuring operation settings associated with the given VPN protocol to be utilized during the established VPN connection.

7. The method of claim 1, wherein configuring the given VPN protocol includes configuring, based at least in part on the type of connection, the given VPN protocol to operate using a given frequency associated with a keep-alive ping.

8. A device associated with a virtual private network (VPN), the device comprising:

a memory; and a processor communicatively coupled to the memory, the memory and the processor being configured to:

receive, from a user device prior to a VPN connection being established between the user device and a VPN server, information indicating a type of connection to be utilized by the user device to access a network during the VPN connection after the VPN connection is established with the VPN server, the type of connection including an immobile connection or a mobile wireless connection to access the network;

configure, based at least in part on the indicated type of connection, a given VPN protocol from among a plurality of VPN protocols to be utilized during an established VPN connection with the VPN server; and transmit, to the user device, information associated with the given VPN protocol to enable the user device and the VPN server to utilize the given VPN protocol during the established VPN connection with the VPN server, wherein the user device is to utilize the indicated type of connection to access the Internet during the established VPN connection with the VPN server.

9. The device of claim 8, wherein, to configure the given VPN protocol, the memory and the processor are configured to configure a VPN protocol, other than a default VPN protocol, as the given VPN protocol.

10. The device of claim 8, wherein, to configure the given VPN protocol, the memory and the processor are configured to configure a VPN protocol that is determined to be an optimal VPN protocol for providing a VPN service to be received by the user device during the VPN connection, the VPN service being indicated by the information.

11. The device of claim 8, wherein the information includes one or more parameters indicating an operation of the user device during the established VPN connection.

12. The device of claim 8, wherein, to receive the information, the memory and the processor are configured to receive one or more parameters indicating a mode of operation of the user device during the VPN connection.

13. The device of claim 8, wherein, to configure the given VPN protocol, the memory and processor are configured to configure operation settings associated with the given VPN protocol to be utilized during the established VPN connection.

14. The device of claim 8, wherein configuring the given VPN protocol includes configuring, based at least in part on the type of connection, the given VPN protocol to operate using a given frequency associated with a keep-alive ping.

15. A non-transitory computer-readable medium configured to store instructions, which when executed by a processor associated with a virtual private network (VPN), configure the processor to:

receive, from a user device prior to a VPN connection being established between the user device and a VPN server, information indicating a type of connection to be utilized by the user device to access a network during the VPN connection after the VPN connection is established with the VPN server, the type of connection including an immobile connection or a mobile wireless connection to access the network;

configure, based at least in part on the indicated type of connection, a given VPN protocol from among a plurality of VPN protocols to be utilized during an established VPN connection with the VPN server; and transmit, to the user device, information associated with the given VPN protocol to enable the user device and the VPN server to utilize the given VPN protocol during the established VPN connection with the VPN server, wherein the user device is to utilize the indicated type of connection to access the Internet during the established VPN connection with the VPN server.

16. The non-transitory computer-readable medium of claim 15, wherein, to configure the given VPN protocol, the processor is configured to configure a VPN protocol, other than a default VPN protocol, as the given VPN protocol.

17. The non-transitory computer-readable medium of claim 15, wherein, to configure the given VPN protocol, the processor is configured to configure a VPN protocol that is determined to be an optimal VPN protocol for providing a VPN service to be received by the user device during the VPN connection, the VPN service being indicated by the information.

18. The non-transitory computer-readable medium of claim 15, wherein the information includes one or more parameters indicating an operation of the user device during the established VPN connection.

19. The non-transitory computer-readable medium of claim 15, wherein, to receive the information, the processor is configured to receive one or more parameters indicating a mode of operation of the user device during the VPN connection.

20. The non-transitory computer-readable medium of claim 15, wherein, to configure the given VPN protocol, the processor is configured to configure operation settings associated with the given VPN protocol to be utilized during the established VPN connection.

* * * * *